United States Patent [19]
Curbelo et al.

[11] Patent Number: 5,657,122
[45] Date of Patent: Aug. 12, 1997

[54] TECHNIQUE FOR ACHIEVING PREFERRED OPTICAL ALIGNMENT IN A SCANNING INTERFEROMETER

[75] Inventors: Raul Curbelo, Lexington; David B. Johnson, Needham, both of Mass.

[73] Assignee: Bio-Rad Laboratories, Inc., Hercules, Calif.

[21] Appl. No.: 481,227

[22] Filed: Jun. 6, 1995

[51] Int. Cl.$^6$ ............................................. G01B 9/02
[52] U.S. Cl. ............................................. 356/346; 356/358
[58] Field of Search ............................................. 356/345, 346, 356/358

[56] References Cited

U.S. PATENT DOCUMENTS

| | | | |
|---|---|---|---|
| 4,053,231 | 10/1977 | Fletcher et al. | 356/346 |
| 4,480,914 | 11/1984 | Thompson et al. | 356/346 |

*Primary Examiner*—Georgia Y. Epps
*Assistant Examiner*—Robert Kim
*Attorney, Agent, or Firm*—Townsend and Townsend and Crew LLP

[57] ABSTRACT

Alignment circuity and calibration method for a scanning interferometer. Phase shifts are introduced into the alignment servo to maximize overall modulation efficiency.

15 Claims, 4 Drawing Sheets

TECHNIQUE FOR ACHIEVING PREFERRED OPTICAL ALIGNMENT IN A SCANNING INTERFEROMETER

BACKGROUND OF THE INVENTION

The present invention relates generally to interferometers, and more specifically to techniques for stabilizing the alignment in a rapid scan Michelson interferometer used in a Fourier transform spectrometer.

A Fourier transform spectrometer typically includes a Michelson interferometer into which a broadband (typically infrared) beam to be analyzed and a monochromatic beam are directed. The interferometer has a fixed mirror and a movable mirror which is driven at a nominally constant velocity over a portion of its travel. Each of the input beams is split at a beamsplitter with one portion traveling a path that causes it to reflect from the fixed mirror and another portion traveling a path that causes it to reflect from the movable mirror. The portions of each beam recombine at the beamsplitter, and due to optical interference between the two portions, the intensity of the monochromatic beam and the intensity of each frequency component of the infrared beam is modulated at a frequency proportional to the components optical frequency and the mirror velocity.

The recombined beams are directed to appropriate detectors. The detector output for the infrared beam represents the superposition of these modulated components and provides an interferogram whose Fourier transform yields the desired spectrum. The monochromatic beam provides a nominally sinusoidal reference signal whose zero crossings occur each time the moving mirror travels an additional one quarter of the reference wavelength. The data acquisition electronics are triggered on these zero crossings to provide regularly sampled values for the interferogram. With the appropriate choice of mirror velocity, the output signal can be made to fall within a convenient range of modulation frequencies, as for example in the audio range. The mirror velocity can be stabilized by comparing the monochromatic output signal to a stable clock signal to produce an error signal, and applying a correction signal to the mirror drive so as to null the error signal.

A measure of the performance of an interferometer is the modulation efficiency, which is the strength of modulation (seen at the output) of the total input optical beam by a scanning interferometer. This is often measured as the ratio of the peak energy variation to the average output energy. The modulation efficiency is typically maximized by orienting the interferometer's optical elements, namely the beamsplitter, moving mirror, and fixed mirror such that the beamsplitter is located in the plane that bisects the planes defined by the fixed and the moving mirror when at zero retardation. This orientation also minimizes the sensitivity to small misalignments (transverse tilts) of the optical elements. Ideally, this orientation achieves uniformity of optical retardation within the entire cross section of the optical beam entering and exiting the interferometer.

It is known to correct for mirror misalignment relative to the beamsplitter by introducing a plurality of spatially separated monochromatic beams, typically two in addition to the main reference beam, each with a separate detector, providing actuators for tilting one of the optical elements (typically the fixed mirror), comparing the various monochromatic detector signals to each other to generate alignment error signals based on phase differences among the monochromatic detector signals, and applying correction signals to the actuators so as to null the alignment error signals.

SUMMARY OF THE INVENTION

The present invention provides a technique for stabilizing the alignment in a Michelson interferometer.

The present invention recognizes, and solves, a problem with the prior art regime for maintaining relative alignment of the beamsplitter and mirrors. In short, the prior art, by seeking to match the phases of the monochromatic signals of the three monochromatic beams to achieve ideal optical alignment, overlooks potential consequences of the fact that the optical components are not always available with the desired flatness. Thus efforts to achieve the particular desired alignment are normally successful in aligning the regions of the beamsplitter and mirrors impinged on by the monochromatic beams. Since these regions are typically small, local distortions in any of these regions can cause the beamsplitter and mirrors to be significantly out of alignment over most of their surface areas.

The present invention addresses this problem by a return to basics. What is intended to be maintained during operation is an alignment that maximizes modulation efficiency when the optical elements are illuminated over an extended area. While, in a world of perfectly flat optical elements, this can be achieved by the prior art technique of nulling signals representing phase differences among the closely spaced reference beams, the present invention rejects this approach. Rather, the invention recognizes that the optimum alignment from the point of view of maximizing modulation efficiency is one where there will in general be phase differences among the monochromatic signals.

In embodiments of the invention, the circuitry used for servo control of the alignment is responsive to a set of alignment sensing signals and generates a set of alignment error signals. The circuitry is configured to allow for modifying the relative phases of the alignment sensing signals in response to modifying values of a set of adjustable input parameters. These input parameters may be adjustable phase shifts incorporated into the alignment sensing signal path or adjustable voltage offsets incorporated into the alignment error signal path. Values of the input parameters corresponding to desired phase differences are incorporated into the servo in a calibration procedure.

In one embodiment of the calibration procedure, the method includes providing a plurality of values for each input parameter, and determining a set of values for the input parameters that maximizes a measurement of modulation efficiency. This is done with the alignment servo enabled and the optical elements illuminated over an extended area. This set of values is then used in the alignment servo.

A further understanding of the nature and advantages of the present invention may be realized by reference to the remaining portions of the specification and to the attached drawings.

DESCRIPTION OF SPECIFIC EMBODIMENTS

System Overview

Figure 1:
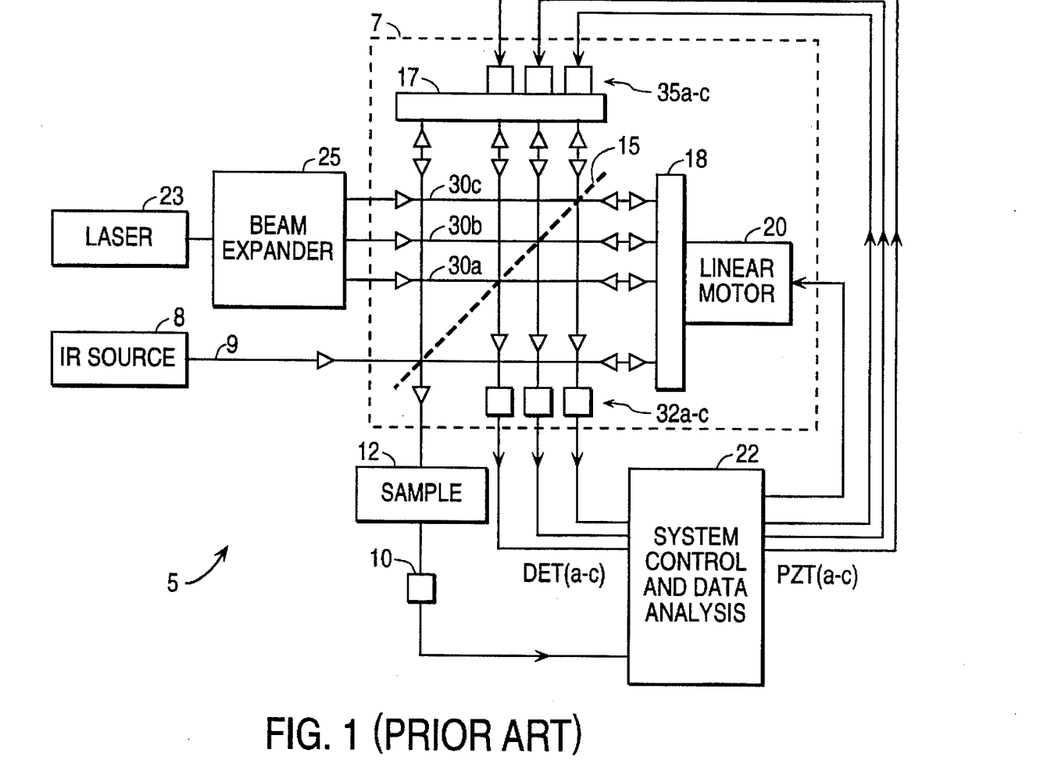
FIG. 1 is a schematic view illustrating the optical and mechanical aspects of the present invention.

FIG. 1 is a schematic view of a Fourier transform spectrometer system 5 incorporating a stabilized Michelson interferometer 7. In a typical embodiment, the spectrometer system includes a broadband infrared source 8, which provides an infrared beam 9, and an infrared detector 10, and is used to perform spectral measurements of a sample 12. Interferometer 7 comprises a beamsplitter 15, a fixed mirror 17, and a movable mirror 18. The two mirrors are shown at 90° to each other, but in a typical embodiment the mirrors are at 60° to each other. A linear motor 20, which may include a solenoid drive coil and an air bearing, effects the movement of mirror 18. Control and data processing electronics 22 control the overall operation of the system. The drawing is labelled "Prior Art" since the configuration, drawn at this high level, represents known technology. The invention contemplates modifications to the control electronics, so that the system, with block 22 incorporating embodiments of the invention, is not prior art.

The underlying purpose of the interferometer in the spectrometer system is to modulate each frequency component of the broadband infrared beam at its own frequency so that when the modulated beam is passed through the sample, the infrared detector signal provides an interferogram. The interferogram is sampled at fixed increments of mirror displacement, and the digitized data subjected to a Fourier transform to yield the desired spectrum. The particular data manipulations are not part of the invention, and will not be described further. A general description, however, can be found in U.S. Pat. No. 5,262,635, which is incorporated by reference for all purposes.

The system further includes a monochromatic reference system to provide signals representing fixed increments of mirror displacement and signals to allow minute adjustments to the angular orientation of the fixed mirror and thus compensate for wobble or systematic tilt of the movable mirror. In prior art designs, the control system was configured to maintain the fixed and movable mirrors at equal angles with respect to the beamsplitter. As will be discussed below, the present invention departs from this approach.

The monochromatic reference system includes a laser 23 with an associated beam expander 25. Beam expander 25 provides a broadened beam, which is shown schematically as including three spatially distinct monochromatic beams 30a–c impinging on the interferometer. The beam locations are shown in a highly stylized manner for clarity. In a typical embodiment, the monochromatic beams impinge on a relatively small central portion of beamsplitter 15, which central portion is optimized for the laser wavelength. The remaining portions of the beamsplitter are optimized for the infrared wavelength range, and the infrared beam impinges on the much larger surrounding portions. The control electronics provide linear motor 20 with an appropriate voltage waveform to drive mirror 18 in a reciprocative fashion with at least a portion of the mirror travel being at substantially constant velocity. The techniques for stabilizing the mirror velocity are not part of the present invention, and will not be described in detail except where relevant to an understanding of the invention.

Infrared beam 9 and each of monochromatic beams 30a–c are split at beamsplitter 15 with one portion traveling a path that causes it to reflect from fixed mirror 17 and another portion traveling a path that causes it to reflect from movable mirror 18. The portions of each beam recombine at beamsplitter 15, and due to optical interference between the two portions, the intensity of each frequency component of the recombined infrared beam and the intensity of each monochromatic recombined beam is modulated at a frequency proportional to the wavelength and the velocity of the mirror. The recombined infrared beam is passed through the sample and directed to detector 10. The three monochromatic recombined beams are directed to respective ones of a triangular array of detectors 32a–c (preferably right-triangular or equilateral-triangular). Detectors 32a–c provide respective output signals, designated DET(a), DET(b), and DET(c). Each of detectors 10 and 32a–c has an associated preamplifier (not separately drawn).

Three actuators 35a–c, preferably piezoelectric transducers (PZTs), are arranged in a corresponding triangular array and interposed between fixed mirror 17 and the interferometer's fixed structure (not shown). The control electronics provides suitable electrical signals, designated PZT(a), PZT(b), and PZT(c) that drive the actuators to cause minute adjustments to the angular orientation of the fixed mirror and thus compensate for wobble of movable mirror 18 or systematic tilt of the movable mirror or of beamsplitter 15. Small velocity variations of the moving mirror can be corrected by incorporating a translational correction signal component into all three actuator drive signals. The arrangement of the actuators so that they cause controlled tilting and translation of the fixed mirror is generally preferred, although it would be possible to place the actuators so that they tilted and translated the beamsplitter or the movable mirror.

Each of the raw modulated monochromatic signals DET(a–c) exhibits a zero crossing each time mirror 18 moves an additional one-quarter the laser wavelength; for a uniform mirror velocity, the signals are sinusoidal. DET(c), suitably manipulated, is used to track the motion of movable mirror 25 and provide signals to trigger the interferogram sampling electronics. As alluded to above, the three monochromatic signals are used to maintain mirror alignment. To the extent that it was desired to maintain the fixed and movable mirrors at equal angles with respect to the beamsplitter, the prior art control systems adjusted the actuators so that the three detector signals were in phase with each other.

It is noted that only two actuators are required for alignment, but it is preferred to have three in order to provide for overall translational control. From an alignment point of view, it is sometimes convenient to refer to DET(a) and DET(b) as the alignment sensing signals and DET(c) as the reference signal.

The Problem Recognized by the Invention

Figure 2A:
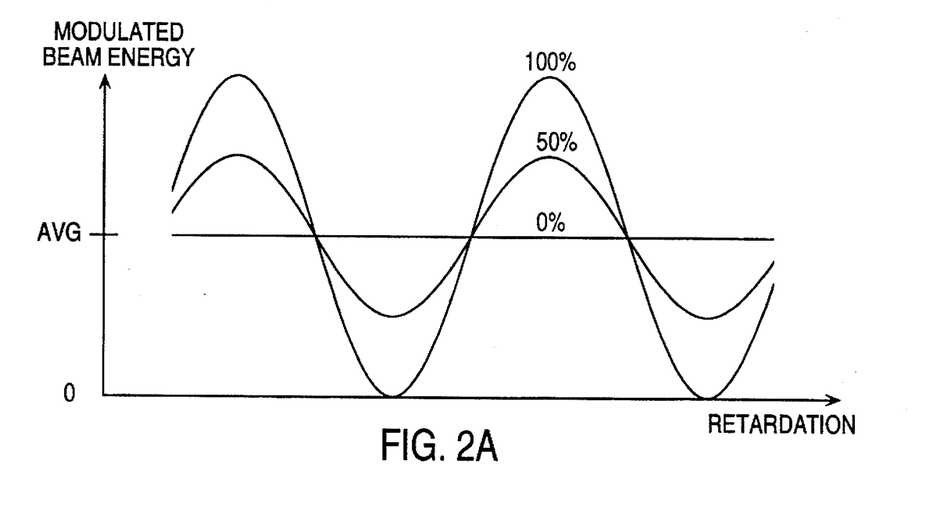
FIG. 2A is a plot of the detector signal for a single wavelength for different values of modulation efficiency.

FIG. 2A is a plot of the detector signal for a single wavelength for different values of modulation efficiency. As can be seen a modulation efficiency of zero gives rise to a detector signal having a substantially constant level, a modulation efficiency of 100% gives rise to a signal with maximum possible swings between zero and twice the average value. The figure also shows a detector signal for a modulation efficiency of 50%.

Figure 2B:
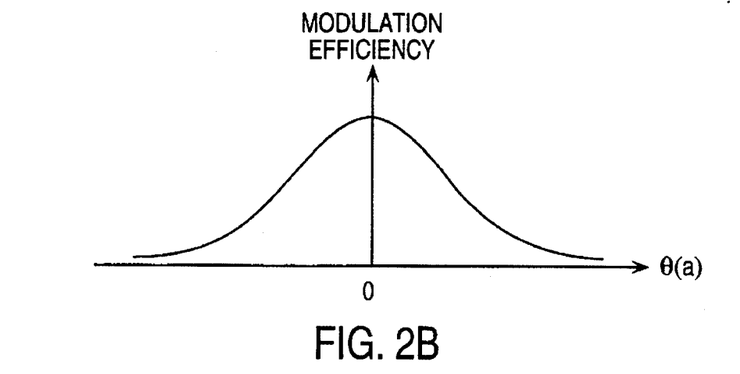
FIG. 2B is a plot of modulation efficiency as a function of mirror tilt for the ideal case.

FIG. 2B is a stylized plot of overall modulation efficiency as a function of the departure of one of the tilt angles designated θ(a), from the nominal zero angle that provides optimum alignment. As can be seen, the plot of modulation efficiency is a generally bell-shaped curve centered around the nominal zero tilt angle. Further, at this nominal zero tilt angle, the modulation efficiency is minimally sensitive to small changes in tilt angle.

When using the method of phase matching of monochromatic signals of the three monochromatic beams to achieve ideal optical alignment, a requirement is that each of the optical elements in the interferometer be a flat surface to a tolerance much less than the shortest wavelength that it is desired to modulate. If any of the optical elements (beamsplitter, moving mirror and/or fixed mirror) is not sufficiently flat, uniform optical retardation can not be attained across the overall interferometer aperture and the modulation efficiency of the interferometer diminishes.

The present invention recognizes, and solves, a problem unrecognized in the prior art regimes for maintaining alignment of the mirrors relative to the beamsplitter. In short, the prior art, by seeking to match the phases of the monochromatic signals of the three monochromatic beams to achieve ideal optical alignment, overlooks potential consequences of the fact that the optical components are not always available with the desired flatness. A condition of particular concern is that of localized distortions at the intercept points of the monochromatic beam components.

Figure 3:
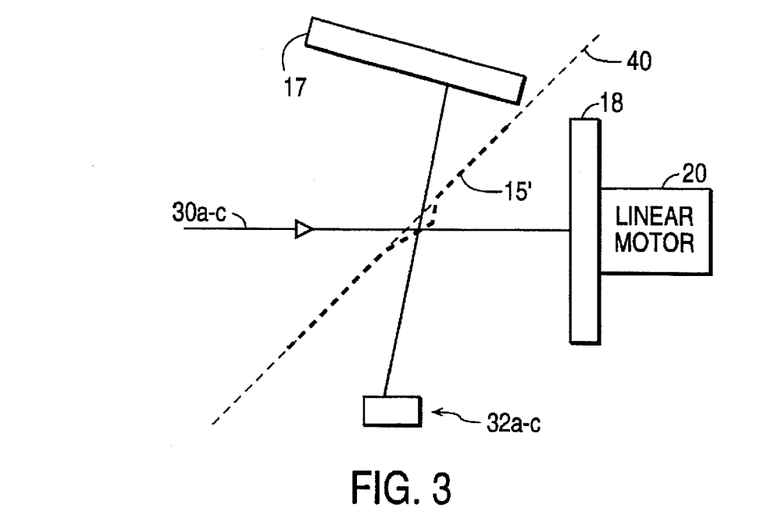
FIG. 3 is a schematic diagram showing the effect of beamsplitter distortion.

FIG. 3 shows an exaggerated view of the situation where the beamsplitter, denoted 15', has a surface irregularity in the region impinged upon by monochromatic beams 30a–c. For simplicity, the three beams are drawn as a single line, and the three detectors are drawn as a single element. The major portion of the beamsplitter is shown as lying in a plane 40 at an angle of 45° to movable mirror 18, and but for the irregularity, the optimal alignment of fixed mirror 17 would be at 90° to the movable mirror. However, since the alignment according to the prior art is performed on the basis of the irregular portion of the beamsplitter (the portion that is not at 45° to movable mirror 18), mirror 17 gets tilted so that it no longer is optimum for the major portion of the beamsplitter.

Figure 4A:
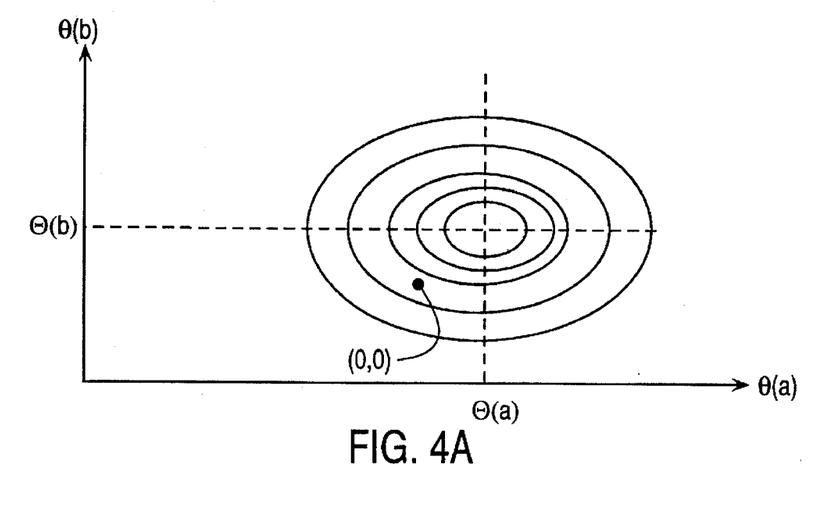
FIG. 4A is a contour plot of overall modulation efficiency as a function of tilt angles.
Figure 4B:
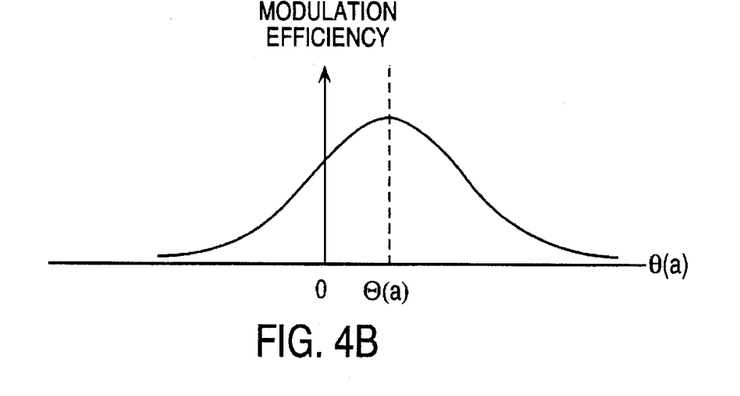
FIG. 4B is a plot of overall modulation efficiency as a function of one of the tilt angles.

The problem is depicted graphically in FIG. 4A, which shows a typical, stylized contour plot of overall modulation efficiency as a function of tilt angles θ(a) and θ(b), and FIG. 4B, which shows a plot of overall modulation efficiency as a function of one of the tilt angles θ(a). It has been found that if measurements of broadband modulation efficiency are taken for various values of the two tilt angles, the maximum modulation efficiency occurs for values of the tilt angles that are typically different from the values that give rise to phase matches among the monochromatic signals. This alignment, characterized by tilt angle values of θ(a) and θ(b), associates itself with the lowest aggregate or RMS variation in retardation over the full optical cross section.

Thus, the servo mechanism that operates to match the phases of the monochromatic signals introduces a run-out of retardation along the aggregate cross section. Since the usable cross section of the interferometer is generally much larger than the separation of the monochromatic beams (in practical designs) the amount of tilt introduced can amplify to significant retardation variation across the width of the interferometer. Similar problems can arise in the event of mirror irregularities. If any of the optical elements is not sufficiently flat, uniform optical retardation cannot be attained across the overall interferometer aperture. The consequences of this are a potentially drastic reduction of modulation efficiency, and a strong sensitivity of the modulated output beam to small dynamic variations in the attitude of either the moving or fixed mirrors during scanning.

The potential significance of the problem can be seen from the following numerical example. With current state of the art beamsplitters manufactured from material such as potassium bromide, which is transmissive for wavelengths up to 20 µm, non-flatness can be found on the order of 40 nm as measured by monochromatic beams at the orientation of preferred optical alignment. If the monochromatic beams are spaced by 5 mm, then the process of locking these beams in phase will introduce a retardation run-out of 400 nm for each 25 mm of optical cross section.

Over a 5-mm total optical cross section, the resultant drop-off in modulation efficiency at a wavelength of 2.5 µm will be on the order of 20 to 40% of maximum efficiency as determined at the preferred optical alignment.

The first derivative of modulation efficiency with respect to alignment is of paramount concern since control loops are subject to dynamic errors. For the non-flatness stated above, and at a 2.5-µm wavelength, this derivative with respect to monochromatic phase shift will be on the order of 1%/phase-angle degree. In order to attain an overall spectrometer stability of 0.1% at 2.5 µm, the control of alignment in this case must be held within 0.1 phase-angle degree. However, spurious sources of contamination are found within the monochromatic retardation measurements that degrade the integrity of such measurements well beyond 0.1 degree of phase.

Hardware Embodiments of the Invention

In brief, the present invention solves the problem described above by incorporating phase shifts into the control electronics so that the actuators drive the mirror to an alignment that maximizes the modulation efficiency over the entire optical cross section rather than an alignment that matches the phases of the monochromatic signals.

Before these phase shifts can be incorporated into the control electronics, empirical measurements must be made to determine the phase shift parameters that maximize the overall modulation efficiency. This procedure will be described in a later section.

Figure 5:
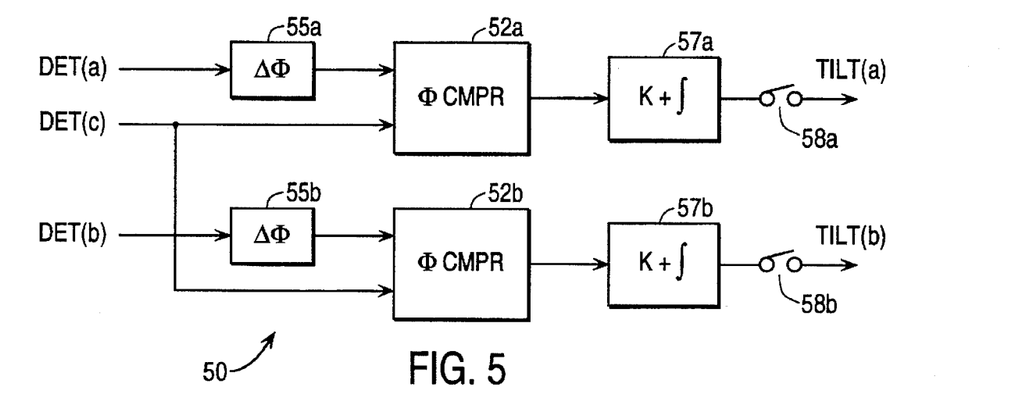
FIG. 5 is a schematic of alignment circuitry according to a first embodiment of the invention.

FIG. 5 is a schematic of alignment circuitry 50 according to a first embodiment of the invention. Monochromatic signals DET(a) and DET(b) are communicated to respective first inputs of zero-crossing phase comparators 52a and 52b through respective adjustable phase shifters 55a and 55b. Monochromatic signal DET(c) is communicated to respective second inputs of phase comparators 52a and 52b. Each phase comparator produces an output error signal that is proportional to the difference between the phases at the phase comparator's first and second inputs.

Thus, phase comparators 52a and 52b produce respective error signals, one proportional to the phase difference between DET(c) and the phase shifted version of DET(a), the other proportional to the phase difference between DET(c) and the phase shifted version of DET(b). These error signals are communicated to respective servo loop compensation circuits 57a and 57b, to produce respective tilt correction signals TILT(a) and TILT(b). These tilt correction signals are combined with translation correction signals, to be described below, to provide the actuator drive signals PZT(a–c). TILT(a) and TILT(b) are incorporated into PZT (a–c) so that the actuators are driven in a manner tending to null the error signals. Switches 58a and 58b are interposed between the servo loop compensation circuits and the actuators to allow the alignment servo to be disabled, as for example during coarse alignment and at the ends of a scan where movable mirror 18 reverses direction.

This embodiment introduces an active phase shift circuit to shift the electrical phase of any or all of the alignment sensing signals prior to being phase detected with respect to the reference signal. This permits the servo mechanism to seek a point of preferred optical alignment while maintaining a phase capture range of ±180 degrees, and a phase lock range of ±360 degrees. Phase shifters 55a and 55b are typically implemented as variable analog delay elements. For example, the delay may be set by trimming a potentiometer in an RC network at the input to an operational amplifier. This embodiment has the disadvantage, therefore, that it can be calibrated for only one frequency, and therefore can only be used for one scan speed of the interferometer.

Figure 6:
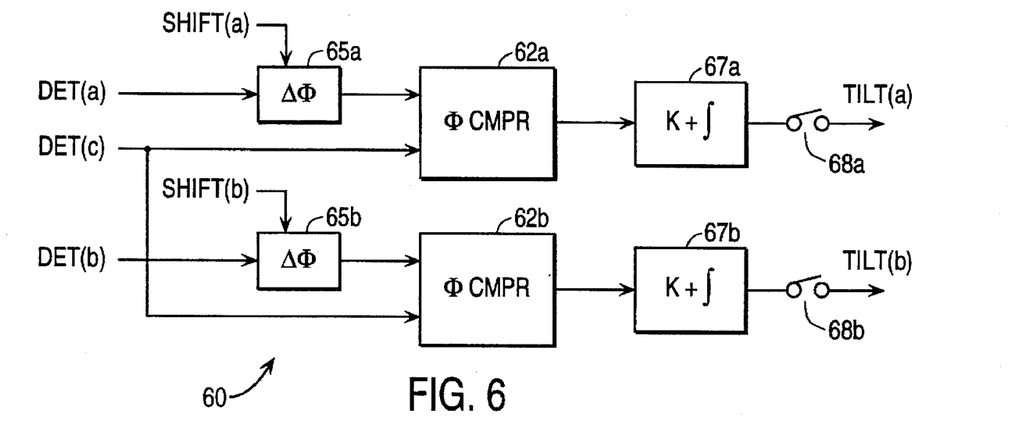
FIG. 6 is a schematic of alignment circuitry according to a second embodiment of the invention.

FIG. 6 is a schematic of alignment circuitry 60 according to a second embodiment of the invention. Monochromatic signals DET(a) and DET(b) are communicated to respective first inputs of zero-crossing phase comparators 62a and 62b through respective digital phase shifters 65a and 65b. The digital delay elements are provided with programmed shift increments SHIFT(A) and SHIFT(b). Monochromatic signal DET(c) is communicated to respective second inputs of phase comparators 62a and 62b. These error signals from the phase comparators are communicated to respective servo loop compensation circuits 67a and 67b. Switches 68a and 68b are interposed between the servo loop compensation circuits and the actuators to allow the alignment servo to be disabled.

This embodiment differs from the embodiment of FIG. 5 in that the phase shifters are digital elements, such as shift registers, which are controlled by a computer. Thus, if different scan speeds are required, different shift values can be loaded into the shift registers. The embodiment has the disadvantage, however, that it requires a synchronization of the measured alignment sensing signals with a high-frequency shift clock, which introduces a random noise component (time jitter) in the measured error signal. This is because the leading edges of the delayed output signal from the delay circuit are necessarily defined by the leading edges of the shift clock while the zero crossing of the detector signal can occur anywhere within the shift clock cycle. Thus for a programmed delay of zero, the output can be shifted by up to one shift clock cycle.

Figure 7:
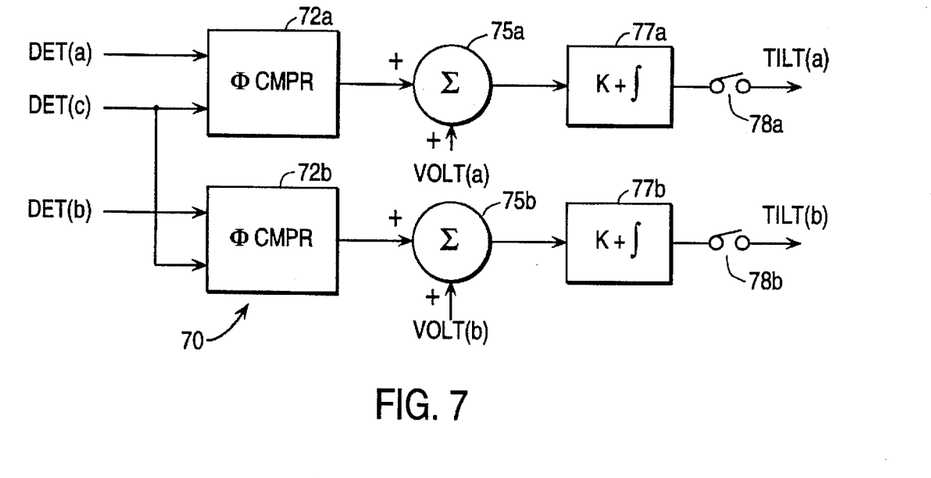
FIG. 7 is a schematic of alignment circuitry according to a third embodiment of the invention.

FIG. 7 is a schematic of alignment circuitry 70 according to a third embodiment of the invention. In this embodiment, the phase shifts are introduced as voltage offsets. Monochromatic signals DET(a) and DET(b) are communicated to respective first inputs of zero-crossing phase comparators 72a and 72b. Monochromatic signal DET(c) is communicated to respective second inputs of phase comparators 72a and 72b. As above, each phase comparator produces an output signal that is proportional to the difference between the phases at the phase comparator's first and second inputs.

In this case, the output signal from phase comparator 72a is proportional to the phase difference between DET(a) and DET(c), while the output signal from phase comparator 72b is proportional to the phase difference between DET(b) and DET(c). The output signals from the phase comparators are communicated to respective first inputs of summing nodes 75a and 75b, and thence to respective servo loop compensation circuits 77a and 77b. Voltage offsets representing desired phase shifts are applied to respective second inputs of summing nodes 75a and 75b. The voltage offsets may be generated by an analog circuit, or may be provided by a suitably controlled digital-to-analog converter. Switches 78a and 78b are interposed between the servo loop compensation circuits and the actuators to allow the alignment servo to be disabled.

In this embodiment, the phase detector output signals are offset by an equivalent corrective amount and then amplified and fed back to the controlled optical element. This has the advantage that the circuit does not require further adjustment for different frequencies. One disadvantage, however, is that the capture and lock range of the phase detector is reduced by the amount of equivalent phase shift. This is because the capture range becomes asymmetric about the lock point when phase detector output signal is offset before being fed back in the servo loop. This requires that the pre-align process, which must coarsely align the interferometer, be more precise in reaching the preferred optical alignment prior to commanding to lock. With digital type edge phase detecting, this embodiment can also produce undesirable ac components in the steady state, zero-error condition.

Figure 8:
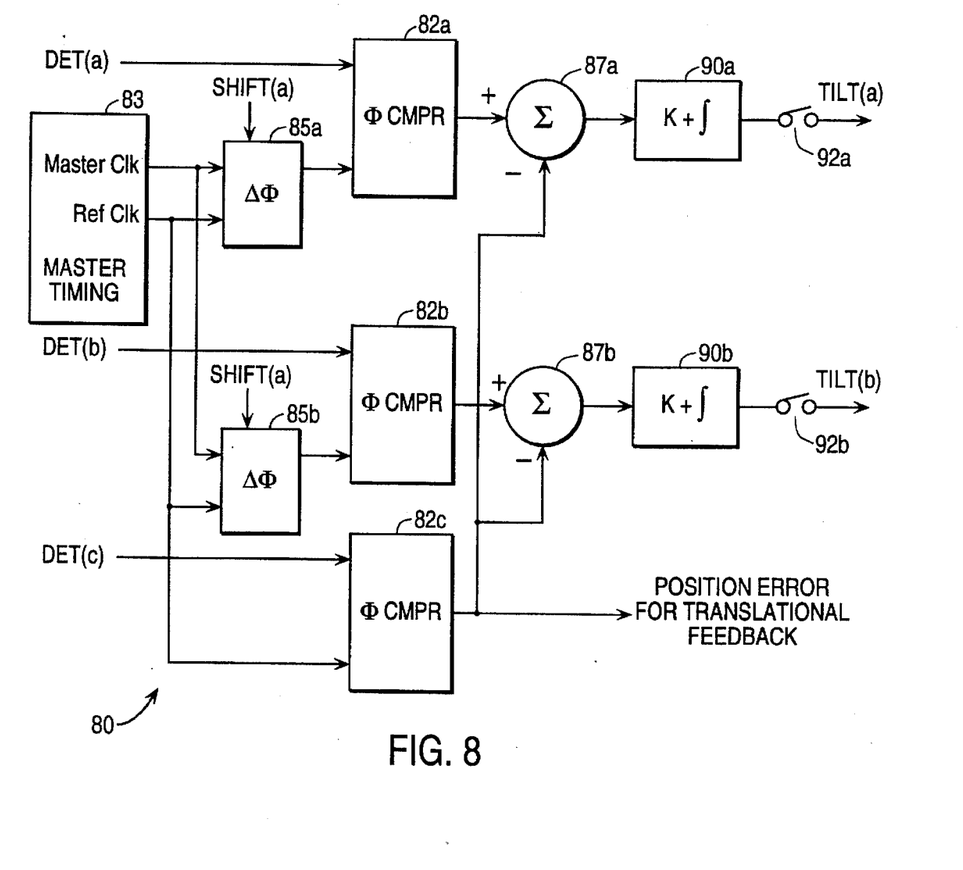
FIG. 8 is a schematic of alignment circuitry according to a fourth embodiment of the invention.

FIG. 8 is a schematic of alignment circuitry 80 according to a fourth, and presently preferred, embodiment of the invention. This embodiment differs from the embodiments described above in that the alignment circuitry and the circuitry responsible for controlling the overall position (and velocity) of the moving mirror are somewhat coupled. Accordingly, this figure also shows portions of the circuitry for keeping the relative velocity of moving mirror 18 constant.

In this embodiment, the alignment sensing signals do not get compared to DET(c), but instead get compared to a reference uniquely derived from the system master clock for each of the alignment sensing signals. Monochromatic signals DET(a), DET(b), and DET(c) are communicated to respective first inputs of zero-crossing phase comparators 82a, 82b, and 82c.

The control electronics further includes master timing circuitry 83, which includes a master oscillator and various frequency dividers, typically implemented with counters. Two output signals from this timing circuitry are a high-frequency signal, referred to as the master clock, and a signal, referred to as the monochromatic reference clock, at a submultiple of the master clock frequency.

In accordance with known practice, the monochromatic reference clock is communicated to the second input of phase comparator 82c, to be compared with DET(c). Errors from this comparison are fed back to linear motor 20, which drives moving mirror 18, and at least some components are also fed back to the controlled mirror as purely translational commands (actuators 35a–c all driven in common and the retardation seen at each detector affected the same way).

The master clock signal is communicated to respective second inputs of phase comparators 82a and 82b through respective digital delay elements 85a and 85b, and to the second input of phase comparator 82c. As above, each phase comparator produces an output signal that is proportional to the difference between the phases at the phase comparator's first and second inputs.

In this case, the output signal from phase comparator 82a is proportional to the phase difference between DET(a) and a programmably delayed version of the monochromatic reference clock, while the output signal from phase comparator 82b is proportional to the phase difference between DET(b) and an independently programmably delayed version of the monochromatic reference clock. The output signals from the phase comparators are communicated to respective first inputs of summing nodes 87a and 87b, and thence through respective servo loop compensation circuits 90a and 90b. Switches 92a and 92b are interposed between the servo loop compensation circuits and the actuators to allow the alignment servo to be disabled.

The result of comparing each alignment sensing detector to its own phase shifted master clock is that the process of phase comparison produces a signal that contains the sum of alignment error (retardation differences between each alignment detector and the reference) plus the scanning retardation error (the same signal that appears from phase comparing the reference signal to its own master clock). Recovering the pure alignment error signals is accomplished by subtracting the reference phase detector error from each of the align sensing phase detector errors at summing nodes 85a and 85b to provide the TILT(a) and TILT(b) signals. The modified align sensing signals are then fed back to the controlled mirror to produce purely rotational commands. It noted that the entire scanning retardation error is subtracted from the phase comparator signals while a portion may be added back to provide PZT(a) and PZT(b).

The advantages of this embodiment represent a convergence of the strengths of each of the other embodiments. It has full phase comparator capture and lock ranges and can be programmed for any monochromatic frequency. Further, since each of the digital delay elements receives at its inputs the master clock and the monochromatic reference clock, which is derived from the master clock, there is no synchronization noise.

The ability to program this phase shift serves an even higher purpose: it allows the beamsplitter in the interferometer to be interchanged and a new set of phase shifts introduced to achieve a preferred optical alignment with any beamsplitter. When supplemented with a beamsplitter identification method, a stored preferred alignment orientation can thus be retrieved.

Alternatively, an automated process can be devised in which the spectrometer containing the interferometer can directly assess the modulation efficiency of the of the interferometer while making adjustments to the programmed phase shifts for the align sensing signals. When modulation efficiency is found to be maximal, these phase shifts are stored and retained until the beamsplitter is replaced.

Specific Implementation Details

Mentioned below are implementation details that are generally applicable to any of the embodiments described above.

The general purpose of the compensation circuits is to introduce gain into the loop and compensate for frequency response differences in the loop, and these circuits can be implemented in a number of ways. As illustrated, each servo loop compensation circuit provides an output signal that is proportional to the sum of the integral of the error signal and a constant times the error signal. A simple integrator is possible, but providing the linear term tends to stabilize the servo loop. In a current implementation, each servo loop compensation circuit includes a high-gain amplifier and a low-pass filter (cutoff on the order of 16 Hz) rather than an integrator. The overall loop gain is on the order of 30–50.

Further, as mentioned above, the tilt correction signals TILT(a) and TILT(b) signals are incorporated into the actuator drive signals PZT(a–c). In one possible implementation, TILT(a) is added into PZT(a) and TILT(b) is added into PZT(b). However, in a current implementation, TILT(a) is added into PZT(a) while a fraction of TILT(a) (say 20–60%) is subtracted from PZT(b) and PZT(c). Similarly, TILT(b) is added into PZT(b) while a fraction of TILT(b) is subtracted from PZT(a) and PZT(c). This is done in order to decouple the tilt corrections from the translational feedback where all three actuators are driven in unison.

Calibration Techniques

The present invention requires a calibration procedure to determine, and incorporate into the servo loop, the phase shifts that maximize overall modulation efficiency. As a threshold matter, it is useful to consider the particular modulation efficiency parameter that is to be maximized, since modulation efficiency can be defined and measured a number of ways. For a single wavelength, the modulated beam's energy variation is sinusoidal, and the modulation efficiency may be simply defined as the ratio of the amplitude of the detector signal to the average value of the detector signal.

Typically, in a spectrometer, the modulation efficiency parameter of interest is that for the aggregate modulated non-monochromatic beam that exits the interferometer. Since the modulation efficiency is more sensitive to misalignment at shorter wavelengths, a current calibration procedure operates to monitor the modulation efficiency of a single wavelength component in the short-wavelength portion of the spectral range of interest. A wavelength of 2.5 μm is suitable for the mid-infrared.

The particular way that this is monitored is allowing a spectral calculation to be performed on the infrared beam, and determining the spectral contribution at the 2.5-μm wavelength. This is done by determining a ratio to a reference transmission spectrum. The value from the ratio spectrum is proportional to the modulation efficiency at 2.5 μm.

A preferred calibration process includes interactively determining the values for the phase shifts that maximize the modulation efficiency parameter of interest. Specifically, the alignment servo is enabled, and measurements of modulation efficiency are made as the phase shift parameters are varied.

In the case of the embodiment of FIG. 5, which uses an adjustable analog delay element, the phase shift parameters are varied by adjusting the value of a circuit parameter such as a variable resistor. For the embodiments of FIGS. 6 and 8, which use digital phase shift elements, the phase shift parameters are digital values that are loaded into a counter or a shift register. For the embodiment of FIG. 7, the phase shift parameters are voltage values that are fed into the summing nodes.

Finding the phase shift parameter values that maximize the modulation efficiency parameter is preferably accomplished by setting one phase shift parameter, and then varying the other over the entire range, with the process being repeated for values of the first-mentioned phase shift parameter varied over the range. This yields a two-dimensional array of modulation efficiency values as a function of the two phase shift parameters. The phase shift parameter values that correspond to the maximum value of the modulation efficiency parameter can then be incorporated into the circuitry.

An alternative way to perform the calibration is to vary the orientation of one of the optical elements of the interferometer with the alignment servo disabled and find the orientation that maximizes the modulation efficiency parameter. It is assumed that the selected mechanism will allow rotation of the element with two degrees of freedom.

Even though, during operation with the alignment servo enabled, the alignment will be maintained by the PZT actuators that support the fixed mirror, it suffices at this stage to adjust the orientation of whatever element is most convenient. This may entail manipulating set screws in the locating hardware for the beamsplitter or adjusting (DC) electrical sources that are summed into the signals for the PZT actuators.

The modulation efficiency is then measured for various orientations over a range that is expected to include the preferred orientation. Once the orientation that maximizes the overall modulation efficiency is found, the interferometer is set with that orientation, and operated with the switches open (alignment servo still disabled). The error signals that are communicated to the servo loop compensation circuit are observed, and the phase shift parameters are then adjusted to null these observed error signals. Then, when the alignment servo is enabled, the servo will move the actuators to positions that result in these desired phase shifts.

Conclusion

In conclusion, it can be seen that the present invention recognizes and solves a problem that heretofore stood in the way of optimizing spectrometer performance. While the above is a complete description of the preferred embodiment of the present invention, various modifications, alternative constructions, and equivalents may be used.

For example, while PZTs are preferred for actuators 35a–c, it may be possible, at least under some circumstances to use spring-loaded electromagnets or a electro-mechanical arrangement such as a stepping motor.

Therefore, the above description and illustrations should not be taken as limiting the scope of the present invention which is defined by the appended claims.

What is claimed is:

1. A method for controlling the alignment of an optical instrument having an adjustable element, the method comprising the steps of:

in a first stage, providing a servo that generates an alignment error signal representing an orientation of the adjustable element, monitors the alignment error signal, and moves the adjustable element in response to the alignment error signal in a manner tending to null the alignment error signal and thus providing an orientation of the adjustment element that maximizes a first performance criterion of the optical instrument, providing a mechanism to modify at least one electrical signal in the servo by modifying a value of an adjustable input parameter so that when the servo operates in a manner tending to null the alignment error signal, a modified orientation of the adjustable element results, which modified orientation no longer maximizes the first performance criterion, with the servo operating, measuring a second performance criterion of the optical instrument for a plurality of values of the input parameter, the second performance criterion being different from the first performance criterion, determining a value of the input parameter that maximizes the second performance criterion, and setting the input parameter to the value, so determined; and in a second, subsequent stage, operating the optical instrument using the servo whereby the servo operates to maintain the adjustable element in an orientation that maximizes the second performance criterion.

2. The method of claim 1 wherein:

the optical instrument is an interferometer having a set of calibration beams illuminating a relatively small portion of the adjustable element and an analytical beam illuminating a relatively large portion of the adjustable element;

the first performance criterion is a parameter representing modulation efficiency with respect to the set of calibration beams; and the second performance criterion is a parameter representing modulation efficiency with respect to the analytical beam.

3. The method of claim 1 wherein:

the alignment error signal is generated to represent a phase difference between two input signals;

the mechanism modifies the phase of one of the input signals; and the adjustable input parameter is a phase shift.

4. The method of claim 1 wherein:

the servo includes a phase comparator having an output signal representing a phase difference between two input signals;

the mechanism modifies the output signal of the phase shift comparator; and the adjustable input parameter is a voltage offset applied to the output signal of the comparator.

5. In an interferometer having a plurality of optical elements including a controllable element coupled to an actuator, and a servo that generates an alignment error signal representing a relative orientation of the optical elements and provides a tilt signal to the actuator in order to change the relative orientation of the optical elements so as to null the alignment error signal and thus provide a relative orientation of the optical elements that maximizes a particular performance criterion of the interferometer, a method of controlling the alignment of the interferometer, the method comprising the steps of:

providing a mechanism to modify at least one electrical signal in the servo in response to modifying a value of an adjustable input parameter so that when the servo operates in a manner tending to null the alignment error signal, a modified relative orientation of the adjustable element results, which modified relative orientation no longer maximizes the particular performance criterion;

determining a value of the input parameter that maximizes a modulation efficiency parameter for the interferometer, the modulation efficiency parameter being different from the particular performance criterion; and setting the input parameter to the value, so determined, so that during subsequent operation, the tilt signal maintains a relative orientation of the optical elements that maximizes the modulation efficiency parameter.

6. The method of claim 5 wherein said step of determining a value of the input parameter comprises the substeps of:

with the servo operating, measuring the modulation efficiency parameter of the interferometer for a plurality of values of the input parameter; and determining a value of the input parameter that maximizes the modulation efficiency parameter.

7. The method of claim 5 wherein said step of determining a value of the input parameter comprises the substeps of:

operating the optical instrument while preventing the servo from providing the tilt signal to the actuator, and determining a specific relative orientation of the optical elements that maximizes the modulation efficiency parameter of the optical instrument;

setting the optical elements to the specific relative orientation;

operating the optical instrument while preventing the servo from providing the tilt signal to the actuator, and monitoring the alignment error signal; and operating the optical instrument while preventing the servo from providing the tilt signal to the actuator, and adjusting the input parameter so as to null the alignment error signal during such operation.

8. In an optical instrument having a plurality of optical elements including a controllable element coupled to an actuator, and a servo that generates an alignment error signal representing a relative orientation of the optical elements and provides a tilt signal to the actuator in order to change the relative orientation of the optical elements so as to null the alignment error signal and thus provide relative orientation of the optical elements that maximizes a first performance criterion of the optical instrument, a method of controlling the alignment of the optical instrument, the method comprising the steps of:

providing a mechanism to modify at least one electrical signal in the servo by modifying a value of an adjustable input parameter so that when the servo operates in a manner tending to null the alignment error signal, a modified relative orientation of the optical elements results, which modified relative orientation no longer maximizes the first performance criterion;

while preventing the servo from providing the tilt signal to the actuator, performing the following steps, designated (a), (b), (c), and (d), of (a) operating the optical instrument and determining a specific relative orientation of the optical elements that miximizes a second performance criterion of the optical instrument, the second performance criterion being different from the first performance criterion, (b) setting the optical elements to the specific relative orientation, (c) operating the optical instrument and monitoring the alignment error signal, and (d) operating the optical instrument and adjusting the input parameter so as to null the alignment error signal during such operation; and thereafter, allowing the servo to provide the tilt signal to the actuator, whereupon during operation of the optical instrument the servo operates to maintain the specific relative orientation.

9. A method of controlling the orientation of a mirror in a scanning Michelson interferometer, the method comprising the steps of:

directing a plurality of monochromatic beams so as to impinge on a relatively small area of the interferometer;

detecting a corresponding plurality of monochromatic detector signals;

directing an analytic beam so as to impinge on a relatively large area of the interferometer;

detecting an analytic detector signal that is characterized by a modulation parameter;

providing a servo that tilts the mirror in response to the monochromatic detector signals so as to establish a phase relationship among the monochromatic detector signals, the phase relationship being characterized by adjustable phase offsets;

determining a set of values for the adjustable phase offsets that causes the servo to tilt the mirror to an orientation that results in a desired level for said modulation parameter; and setting the servo to operate using the set of values, so determined.

10. A control mechanism for a scanning interferometer having a set of optical elements and a monochromatic reference system that provides a reference signal, the control mechanism comprising:

first and second actuators for controllably adjusting the relative orientation of at least one optical element in the scanning interferometer;

first and second alignment sensing detectors providing first and second alignment sensing signals;

first and second phase comparators, each having respective first and second inputs and a respective output;

said first and second inputs of said first phase comparator coupled to receive signals representing said first alignment sensing signal and said reference signal, respectively;

said first and second inputs of said second phase comparator coupled to receive signals representing said second alignment sensing signal and said reference signal, respectively;

a first adjustable phase shifting element coupled to a selected one of said first and second inputs of said first phase comparator so as to introduce a first adjustable phase shift between said first alignment sensing signal and said reference signal as received at said first and second inputs of said first phase comparator;

a second adjustable phase shifting element coupled to a selected one of said first and second inputs of said second phase comparator so as to introduce a second adjustable phase shift between said second alignment sensing signal and said reference signal as received at said first and second inputs of said second phase comparator;

a first servo loop compensation element coupled between the output of said first phase comparator and said first actuator; and a second servo loop compensation element coupled between the output of said second phase comparator and said second actuator.

11. The control mechanism of claim 10 wherein:

said reference system includes a reference detector; and said reference signal is derived from said reference detector.

12. The control mechanism of claim 10 wherein:

said reference system includes a reference clock generator; and said reference signal is derived from said reference clock generator.

13. The control mechanism of claim 10 wherein:

said first adjustable phase shifting element is coupled between said first alignment sensing detector and said first input of said first phase comparator; and said second adjustable phase shifting element is coupled between said second alignment sensing detector and said first input of said second phase comparator.

14. The control mechanism of claim 10 wherein:

said first adjustable phase shifting element is coupled between said monochromatic reference system and said second input of said first phase comparator; and said second adjustable phase shifting element is coupled between said monochromatic reference system and said second input of said second phase comparator.

15. A scanning interferometer comprising:

a set optical elements including a beamsplitter disposed to direct a first portion of input light along a first path and a second portion of the input light along a second path, and first and second mirrors in said first and second paths, respectively, oriented to direct light back to said beamsplitter for recombination;

means for moving one of said optical elements over a range so as to introduce a varying phase shift for light travelling along said first path relative to light travelling along said second path;

a monochromatic reference system providing a reference signal and first and second alignment sensing signals, said first and second alignment sensing signals being characterized by respective phases relative to said reference signal;

means for directing a beam of analytical radiation onto an extended region of said beamsplitter, whereupon said beam of analytical radiation produces at least one recombined beam of analytical radiation including a component that encountered said first mirror and a component that encountered said second mirror;

a detector, disposed to intercept one of said recombined beams of analytical radiation and provide an analytical detector signal, said analytical detector signal being characterized by a modulation parameter;

first and second actuators coupled to at least one of said optical elements, said actuators being responsive to respective first and second tilt signals and operating to change a relative orientation of said optical elements in dependence on said tilt signals; and a servo system, responsive to said alignment sensing signals, for generating said first and second tilt signals to cause said optical elements to assume a relative orientation that depends on said phases of said alignment sensing signals relative to said reference signal;

said servo system including first and second adjustable phase shifting elements that cause said tilt signals to control said first and second actuators so that said alignment sensing signals differ in phase from said reference signal by respective first and second phase shifts;

said first and second phase shifts being adjusted to result in a first value of the modulation parameter, which first value is greater than a second value of the modulation parameter that results when the phase shifts are zero.

\* \* \* \* \*